(No Model.) 2 Sheets—Sheet 1.
L. DAFT.
TUBULAR CONDUCTOR FOR ELECTRIC RAILWAYS.
No. 410,498. Patented Sept. 3, 1889.
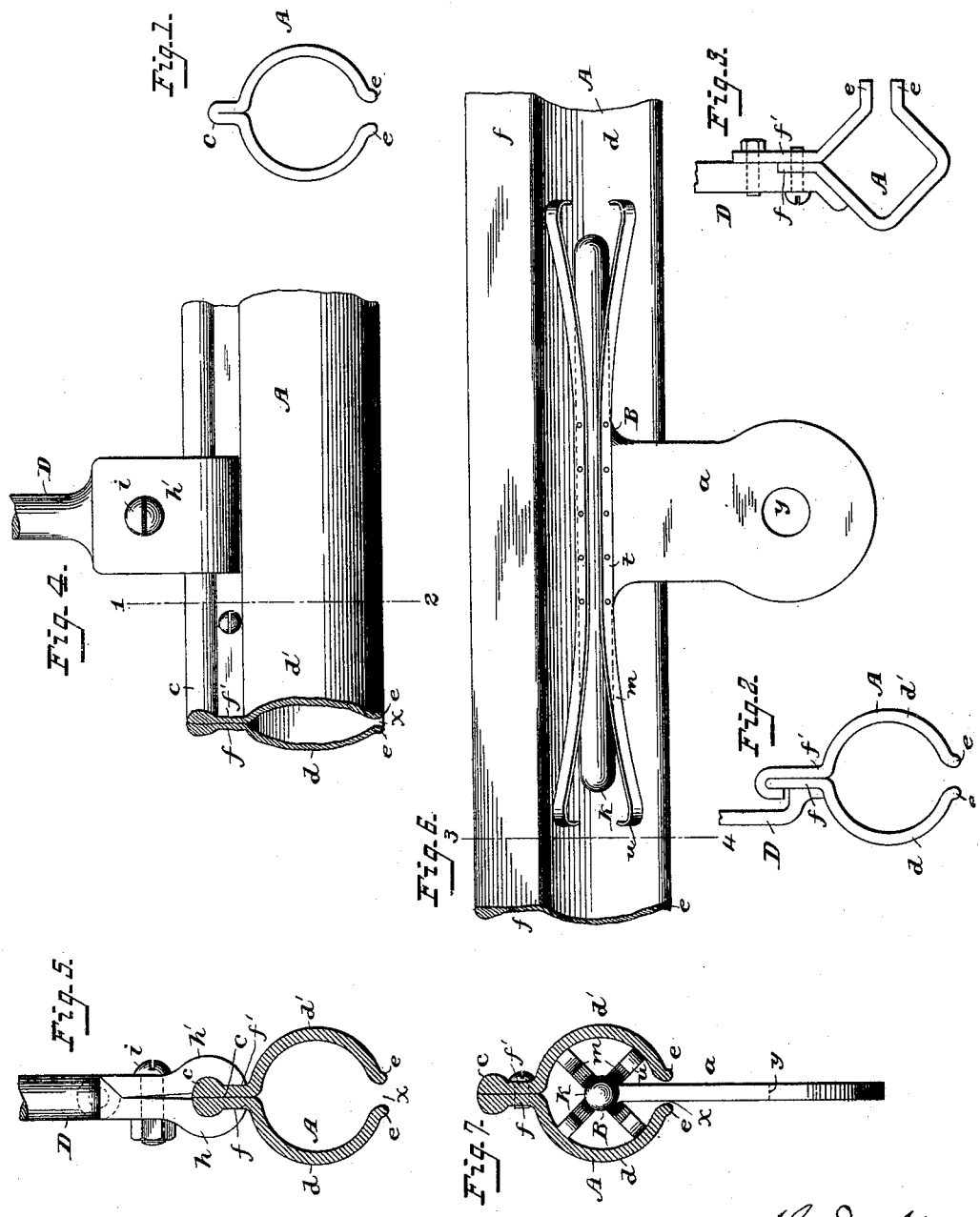
Attest:
Court A Cooper
Wm A Harries
Leo Daft
Inventor
By Dickerson Dort & Truman
Attys.

(No Model.)  2 Sheets—Sheet 2.
L. DAFT.
TUBULAR CONDUCTOR FOR ELECTRIC RAILWAYS.
No. 410,498. Patented Sept. 3, 1889.
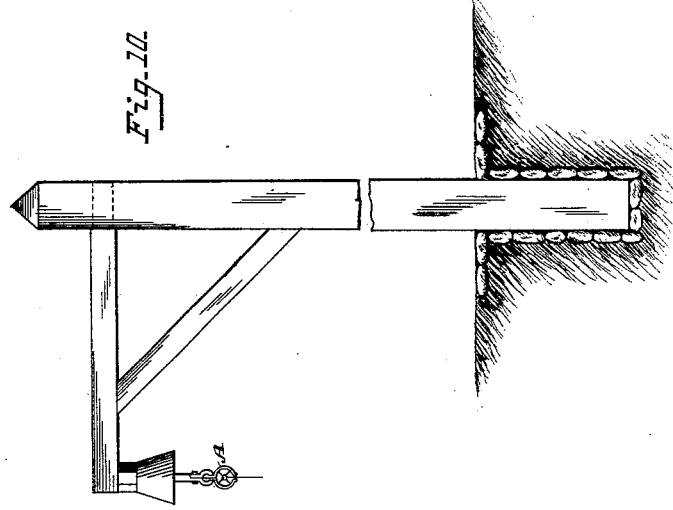
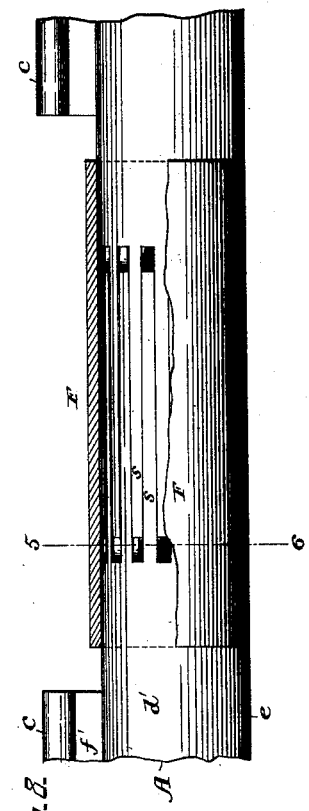
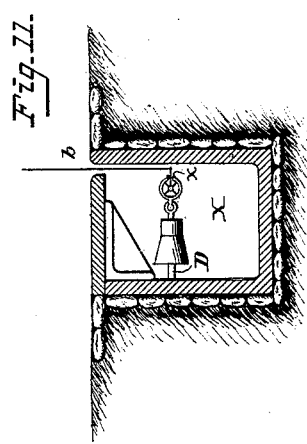
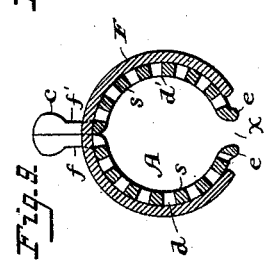
Attest:
Count A Cooper,
Wm A Harries
Inventor:
Leo Daft
By Dickason Foster & Freeman
Attys
N. PETERS, Photo-Lithographer, Washington, D. C.

UNITED STATES PATENT OFFICE.

LEO DAFT, OF PLAINFIELD, NEW JERSEY.

TUBULAR CONDUCTOR FOR ELECTRIC RAILWAYS.

SPECIFICATION forming part of Letters Patent No. 410,498, dated September 3, 1889.

Application filed January 7, 1886. Renewed May 4, 1888. Serial No. 272,854. (No model.)

*To all whom it may concern:*

Be it known that I, LEO DAFT, a subject of the Queen of Great Britain, and a resident of Plainfield, in the county of Union and State of New Jersey, have invented certain new and useful Improvements in Tubular Conductors for Electric Railways, of which the following is a specification.

My invention relates to that class of electrical conductors which are used for transmitting the electrical current to motors upon cars or traveling vehicles; and my invention consists in constructing and suspending the conductor and in constructing the traveling contact-piece, as fully set forth hereinafter, and as illustrated in the accompanying drawings, in which—

Figures 1, 2, and 3 are transverse sections of electrical conductors embodying my invention. Fig. 4 is a side view, in part section, illustrating a conductor and supporting device. Fig. 5 is a section on the line 1 2, Fig. 4. Fig. 6 is a longitudinal view showing one section of the conductor and the traveling contact-piece. Fig. 7 is a transverse section on the line 3 4, Fig. 6. Fig. 8 is a longitudinal view, in part section, showing a coupling between the sections of the conductor. Fig. 9 is a section on the line 5 6, Fig. 8. Fig. 10 is a view illustrating an overhead support for the conductor. Fig. 11 is a section illustrating the mode of supporting a conductor in an underground conduit.

The conductor A is substantially tubular in form and has a longitudinal slot $x$, through which may project the shank $a$ of a carrier or contact-piece B, which fits and travels in the tube, the connection between the contact-piece and the moving object being made by means of a flexible cable, rod, chain, or other connection $b$, attached to said object and also to the shank $a$, which, as shown, is provided with an eye $y$, for facilitating such attachment.

The tubular conductor is preferably of phosphor-bronze, or other material which will not readily oxidize, but has high electrical conductivity, and it may be cast or drawn up in sections, each consisting of one piece of metal—as, for instance, in Fig. 1, where the conductor is represented as consisting of a single sheet of metal bent to form a round tube, with a rib $c$ longitudinally at one side and a longitudinal slot $x$ at the other side, and with flanges $e$ at the edges of the slot. The flanges strengthen the tube and prevent the sides from springing apart or together, and the rib $c$ serves as a means of attaching the tube to its support.

As a tube made of one piece of metal is accessible for the introduction of the traveler and for inspection only at the ends, I prefer to make it in two pieces or sections, which are clamped together along one side, but separated at the other to form the slot $x$. Thus in Fig. 2 the cylindrical tube is shown as consisting of two cast or malleable metal sections $d$ $d'$, one having a flange $f$, which is bolted to the support D, while the other has a flange $f'$, which is clamped to the flange $f$ in any suitable manner. In Fig. 3 the sections are shown as bent to form a rectangular tube open at one side, one section being bolted permanently to the support D, while the other is bolted detachably thereto, so that it may be removed for inspection or the insertion or removal of the traveler.

While I have illustrated the forms shown in Figs. 1, 2, and 3, for the purposes of showing my invention, I prefer the form of tubular conductor illustrated in the remaining figures of the drawings, which show a tubular conductor in the form of a cylinder, consisting of two curved sections $d$ $d'$, with flanges $f$ $f'$, which are bolted together to constitute the rib $c$, the edges of the sections having strengthening flanges or ribs $e$, and the rib $c$ being thickened at its edge, so as to facilitate a strong attachment to the support. The conductor is of course made in sections arranged in line, and in order to permit expansion and contraction without breaking the continuity of the conducting-surface I provide each section with tongues $s$, adapted to fit between the tongues $s$ of the adjacent section and overlapping them for parts of their length, as illustrated in Figs. 8 and 9, the coupling portions of the sections being inclosed by a split tube or guard F, which prevents lateral displacement, while permitting longitudinal motion, the rib $c$ being discontinued at the point where the coupling is made.

The conductor, whether in one piece or in sections, may be bolted by means of the rib $c$ directly to the support D of any suitable character. I prefer, however, to provide the latter with clamps between which the rib may be gripped without disconnecting any part of the supporting device. These clamps may be made in different ways. For instance, each clamp may consist of a jaw $h$ formed upon the fixed portion of the support D, and a movable jaw $h'$, secured to the jaw $h$, by bolts $i$, and the movable jaw may be wholly detachable or may be hinged to the fixed jaw, as indicated in dotted lines, Fig. 5, the jaws being suitably constructed to receive between them the rib $c$.

The carrier B should be of such a length as to prevent undue resistance from the diagonal pull of the connections $b$, which would tend to cant or tilt the traveler and wedge it in the tube if the traveler were of insufficient length. I therefore make the traveler at least twice as long as the diameter of the conductor-tube, and preferably about four times the length of the said diameter.

In order to preserve the contact of the carrier with the conducting-surface, and at the same time allow for inequalities of the latter, so as to avoid the expense of finishing the tubes to an exact gage, I provide the traveler with spring contact-pieces of sufficient stiffness to maintain the body of the traveler in its position in respect to the tube when being towed along the latter, and yet capable of yielding so as to pass over slight projections in the tube. These spring contact-pieces may be constructed and applied in different ways, as shown in Figs. 6 and 7. The body $k$ of the carrier is a cylindrical bar, from which the shank $a$ extends at the center, and the contact-pieces $m$ are bow-shaped springs, secured centrally by a rivet $t$ to the body $k$, and with bent ends $u$, so curved as to ride easily over any projections within the tube.

In Fig. 10 I have shown the tubular conductor A as suspended from an overhead support, which may be used in some instances. In Fig. 11 I have shown it within an underground conduit X, in which case the support D preferably extends from the side of the conduit, and the opening or slot $x$ of the conductor is at one side, so as to permit a ready attachment of the connections $b$ to the shank $a$, and yet prevent the accumulation of water, snow, or dirt in the conducting-tube. By extending the support D from the side of the conduit the conducting-tube may be maintained above the level of any water likely to accumulate in the conduit, and I avoid connecting the conductor to the top of the conduit, which would result in displacing the conductor whenever the top is removed.

Without limiting myself to the precise construction and arrangement of parts shown, I claim—

1. An electrical conductor consisting of a tube, composed of two sections having projections on one side clamped together and separated at the opposite edges to form a longitudinal slot, substantially as set forth.

2. An electrical conductor consisting of two flanged sections, with the flanges clamped together and the opposite edges separated and adapted to receive and retain a traveling contact-piece, substantially as set forth.

3. A tubular electrical conductor provided at one side with a longitudinal slot and at the other with a longitudinal rib for attachment to the support, substantially as set forth.

4. A conductor consisting of two sections having flanges $f f'$ $e e$, substantially as and for the purpose set forth.

5. The combination, with a tubular electrical conductor, of a support provided with clamping-jaws engaging between them a rib or projection upon the conductor and clamping devices which permit them to be opened without being disconnected from each other, substantially as set forth.

6. The combination, with the conductor, of a traveler provided with a cylindrical body, lateral shank, and curved supporting contact-springs arranged longitudinally and secured to the said body at or near their centers only, and having their ends free so as to be in constant contact with the conductor, substantially as and for the purpose set forth.

7. The combination, with the tubular conductor having a slot at one side, of a traveler or contact-piece within the conductor provided with a lateral shank and springs connected thereto at or near the center and free at the ends, and forming a yielding support for the traveler and of a length greater than twice the diameter of the conductor, whereby the traveler is prevented from cramping and conforms to inequalities of the interior of the conductor, substantially as described.

In testimony whereof I have signed my name to this specification in the presence of two subscribing witnesses.

LEO DAFT.

Witnesses:
 JNO. N. BRUNS,
 FRED H. REED.